United States Patent
Hirose et al.

(10) Patent No.: US 6,541,732 B2
(45) Date of Patent: Apr. 1, 2003

(54) LASER MACHINING APPARATUS

(75) Inventors: Kenji Hirose, Tochigi (JP); Shinji Ueda, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/938,522

(22) Filed: Aug. 27, 2001

(65) Prior Publication Data

US 2002/0033384 A1 Mar. 21, 2002

(30) Foreign Application Priority Data

Aug. 30, 2000 (JP) ..................................... 2000/260980

(51) Int. Cl.$^7$ ............................................. B23K 26/073
(52) U.S. Cl. ............................... 219/121.7; 219/121.78
(58) Field of Search ....................... 219/121.7, 121.71, 219/121.67, 121.68, 121.69, 121.61, 121.78–121.79; 359/221, 212

(56) References Cited

U.S. PATENT DOCUMENTS

| | | | |
|---|---|---|---|
| 4,734,558 A | * | 3/1988 | Nakano et al. ......... 219/121.61 |
| 5,552,879 A | | 9/1996 | Takamiya et al. .......... 356/28.5 |
| 6,107,600 A | * | 8/2000 | Kurosawa ................ 219/121.7 |
| 6,210,401 B1 | * | 4/2001 | Lai ............................. 351/209 |
| 6,328,733 B1 | * | 12/2001 | Trost ............................ 606/13 |
| 6,359,255 B1 | * | 3/2002 | Yamamoto et al. .... 219/121.71 |
| 6,362,454 B1 | * | 3/2002 | Liu .......................... 219/121.7 |
| 6,376,799 B1 | * | 4/2002 | Amako et al. ......... 219/121.68 |

FOREIGN PATENT DOCUMENTS

JP          11-333575          12/1999

* cited by examiner

*Primary Examiner*—Tom Dunn
*Assistant Examiner*—Jonathan Johnson
(74) *Attorney, Agent, or Firm*—Fitzpatrick, Cella, Harper & Scinto

(57) ABSTRACT

A system is provided with a laser beam source, a reflector mirror that is a reflecting member for reflecting a laser beam emitted from the laser beam source, a spindle motor that is a rotating and driving unit for rotating and driving the reflector mirror, and a f-θ lens that is a converging unit for converging a laser beam reflected by the reflector mirror. The reflector mirror is rotated and driven under the condition that its normal line is mounted to be slanted to a rotary axis of a spindle motor. The optical axis of the reflector beam of the laser beam introduced into the reflector mirror is deflected so as to take a precession. A circular track is depicted on the surface of a workpiece to be machined by a beam spot converged by the f-θ lens to perform the machining work.

4 Claims, 5 Drawing Sheets

LASER MACHINING APPARATUS

BACKGROUND OF THE INVENTION

1. Field of the Invention

The present invention relates to a laser machining apparatus for performing machining such as drilling a circular hole in a planar object to be machined by means of a laser beam.

2. Related Background Art

Recently, a technology and an apparatus for machining, through processes such as continuously scanning or positioning and projecting a laser beam by using laser energy, heating and burning an object to be machined, sublimating or curing photo-curing resin into a desired shape as in a laser drilling machine, a laser marker or a photo forming machine have been expanded.

As one of such machining apparatus, there is a machining apparatus for converging a laser beam to a workpiece to form a hole therein as disclosed in Japanese Patent Application Laid-open No. 11-333575. In the conventional drilling machine, a galvanomirror for deflecting the beam and an XY table for holding the workpiece are moved to thereby position the beam and a high power beam is projected to perform drilling of a hole based on a size of a beam spot.

FIG. 1 is a perspective schematic view showing a condition where drilling is performed by means of a conventional laser machine. In FIG. 1, reference numeral 101 denotes an optical axis of a laser beam converged, and numeral 700 denotes a workpiece that is an object to be machined and disposed in the position of a beam spot 102 of the laser beam 101. Reference numeral 103 is a graph showing a distribution of optical energy of the laser beam in the beam spot 102. Thus, where the energy of the converged portion exceeds a constant threshold value 104, the temperature of the workpiece 700 is particularly elevated, the workpiece material is molten to be sublimated or chemically changed to gradually form a hole, and finally, a hole 701 passing through the workpiece 700 is formed.

However, in accordance with this method, it is difficult to obtain a hole having an appropriate form with high precision. This is because it is difficult to actually secure the ideal distribution of a true circular form in the energy distribution 103 for the threshold value 104 although the hole 701 is formed into a shape based on the energy distribution 103 of the beam spot 102. Also, since the laser beam is projected to the same position continuously, there is a fear in that the heat is locally accumulated. Accordingly, a blur of an inlet portion of the hole, the change in hole diameter in response to the position in the direction of the plate thickness, the degradation of the cylinder shape of the hole and the like may occur.

For this reason, the true circular degree of the hole formed in accordance with this system is only several to 10% of the diameter.

Accordingly, a method for forming a hole by removing a contour of the hole by rotating the beam spot having a smaller diameter than a diameter of the hole has been developed.

FIG. 2 is a perspective schematic view showing the condition where the hole is formed in accordance with this conventional method.

In FIG. 2, the same reference numerals as those in FIG. 1 are used to indicate the components with the same name and the explanation thereof will be omitted.

According to this method, since the light converged portion may be made small, the optical energy distribution 103 of the laser beam is abruptly changed in the beam spot 102 to obtain the energy distribution 103 with a sharp contrast. The small beam spot 102 is continuously moved to form a hole 202 in the workpiece 700 so that the machining may be performed under the condition where the precision of the inner surface of the machined hole 202 is the same as the track precision of the beam spot 102. Also, the machining is performed while sculpturing inch by inch many times so that the extra heat transmitted to the outside of the machined portion is likely to be radiated and diffused through the workpiece 700 and there is no fear that the blur of the inlet of the hole 701 and the change in hole diameter due to the heat would occur.

A biaxial galvanomirror system as shown in FIG. 3 has conventionally been adopted as a method for deflecting an optical axis of a laser beam for performing the machining of a hole having a high cylinder degree and a high true circular degree of such a hole. In FIG. 3, reference numeral 301 and 302 denote galvanomotors for driving reflector mirrors 303 and 304 mounted on respective galvanomotors 301 and 302 so as to perform the scanning of a laser beam 111 projected from a laser beam source 100 in two directions and converging laser beams 112 and 113 at desired positions of the workpiece 700 through an f-θ lens (not shown). In this case, the operations of two galvanomotors 301 and 302 are caused to cooperate with each other and driven so that the beam spot depicts a circle on the workpiece 700.

In accordance with this system, since the portion to be mechanically driven is only the reflector mirrors 303 and 304, for example, it is possible to depict a circle at a higher speed than the system in which, as shown in a perspective view of the conventional case in FIG. 4, the laser beam 111, the reflector mirror 305 and a convergent lens 601 are fixed and the workpiece 700 is moved in a biaxial manner by the X-Y table 800 so that the circle may be depicted on the workpiece 700.

However, also in the conventional system using the galvanomirrors, under the recent circumstances that the required specification for the speed and the precision of the drilling has become severe, the following problems have been noticed and it is difficult to enhance the performance.

(1) As in the case where a hole is to be formed in a plate having a large thickness, it takes a long machining time when the beam spot is rotated many times to form the hole. Accordingly, even if a slight positional drift component exists in the positioning mechanism of the galvanomirrors, the true circular degree and the cylindrical degree of the hole become worse.

(2) The movable portion is only mirrors in the galvanomirror system. However, the mirrors have to be moved reciprocally. Also, in order to perform the cooperation operation of the two axises, the motion thereof must be performed with high precision, which cause the limitation to the speed.

SUMMARY OF THE INVENTION

In order to overcome the above-noted defects, an object of the present invention is to provide a laser machining apparatus that may perform the machining process at a high speed with high precision by performing rotation and deflection of the light beam and the optical axis with high precision and high reproducibility.

DESCRIPTION OF THE PREFERRED EMBODIMENTS

Figure 1:
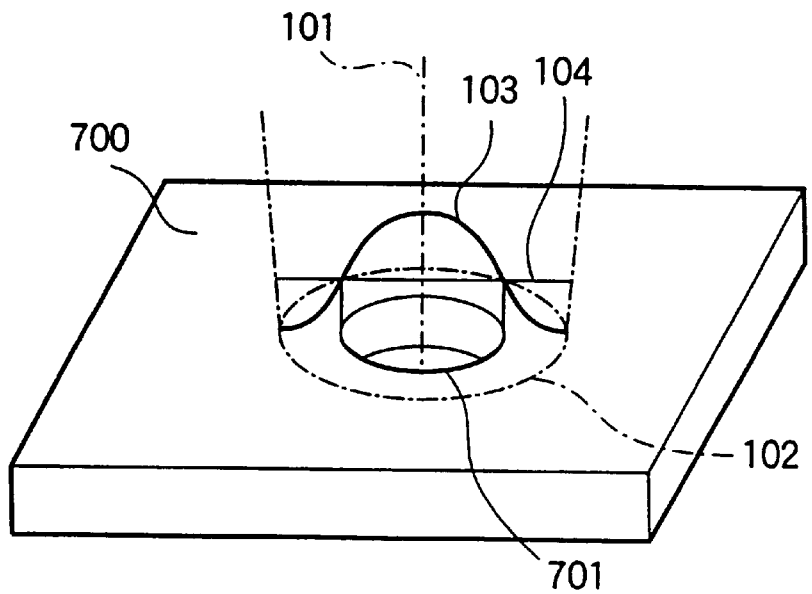
FIG. 1 is a partially enlarged perspective view illustrating a machining principle of a conventional laser machining apparatus.
Figure 2:
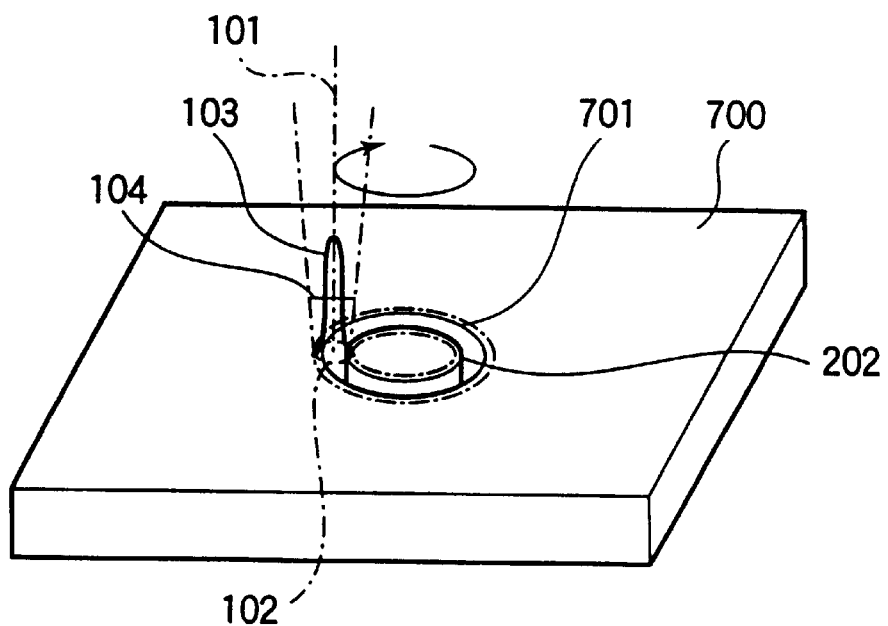
FIG. 2 is a partially enlarged perspective view illustrating another machining principle of a conventional laser machining apparatus.
Figure 3:
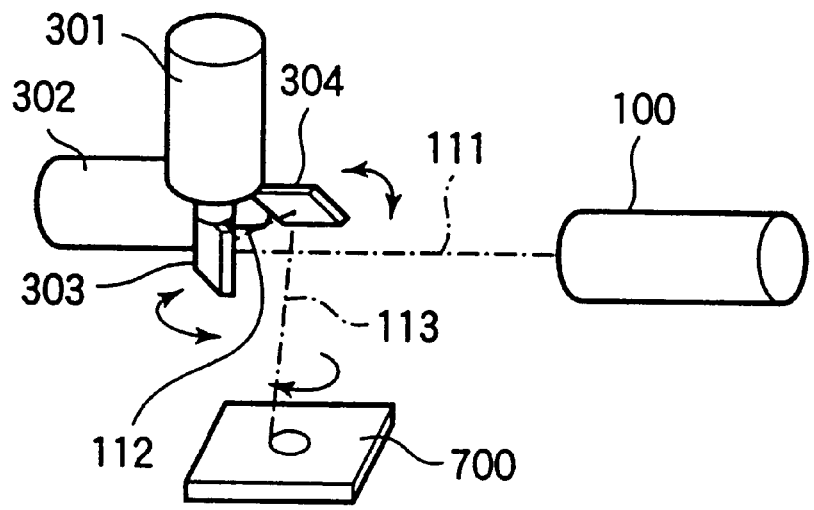
FIG. 3 is a schematic perspective view of a conventional laser machining apparatus.
Figure 4:
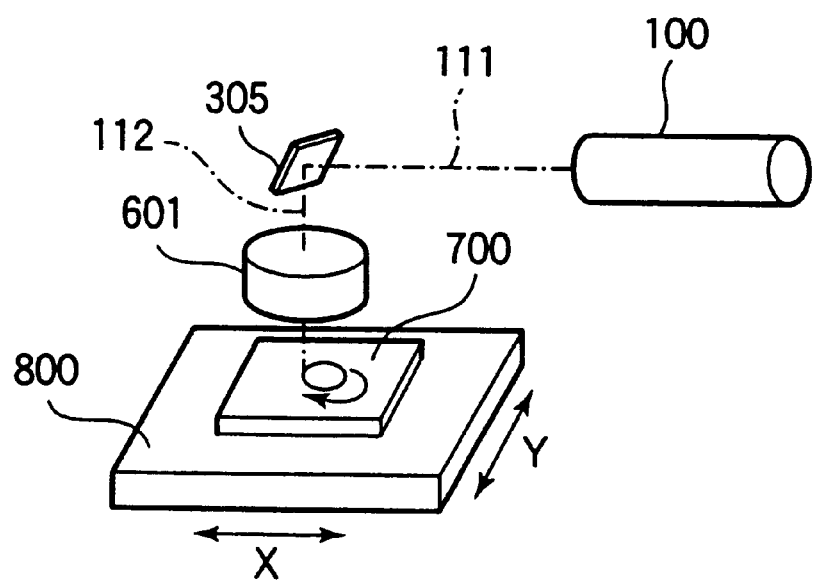
FIG. 4 is a schematic perspective view of another conventional laser machining apparatus.
Figure 5:
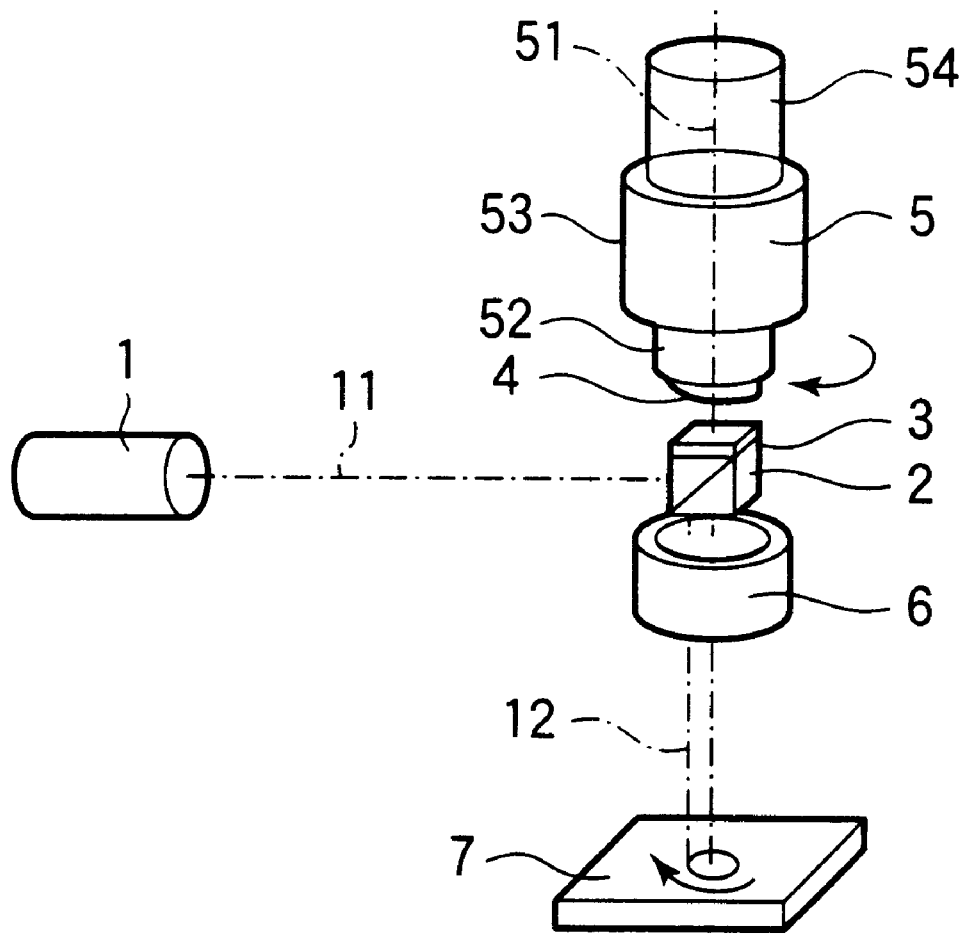
FIG. 5 is a schematic perspective view showing a laser machining apparatus in accordance with an embodiment of the present invention.

FIG. 5 is a schematic perspective view of an embodiment of a laser machining apparatus according to the present invention.

In FIG. 5, reference numeral 1 denotes a laser beam source, numeral 2 denotes a polarization beam splitter for deflecting a component of some polarization surface out of rays of light emitted from the laser beam source 1 and for deflecting the direction of the optical axis, numeral 3 denotes a ¼ wavelength plate for converting the polarization of the laser beam into the circular polarization beam, numeral 4 denotes a reflector mirror for reflecting the rays of light, numeral 5 denotes a spindle motor for driving and rotating the reflector mirror 4, and numeral 6 denotes an f-θ lens for converting the light beam based on an incident angle. Reference numeral 7 denotes a workpiece positioned at the converged position of the f-θ lens.

Figure 6:
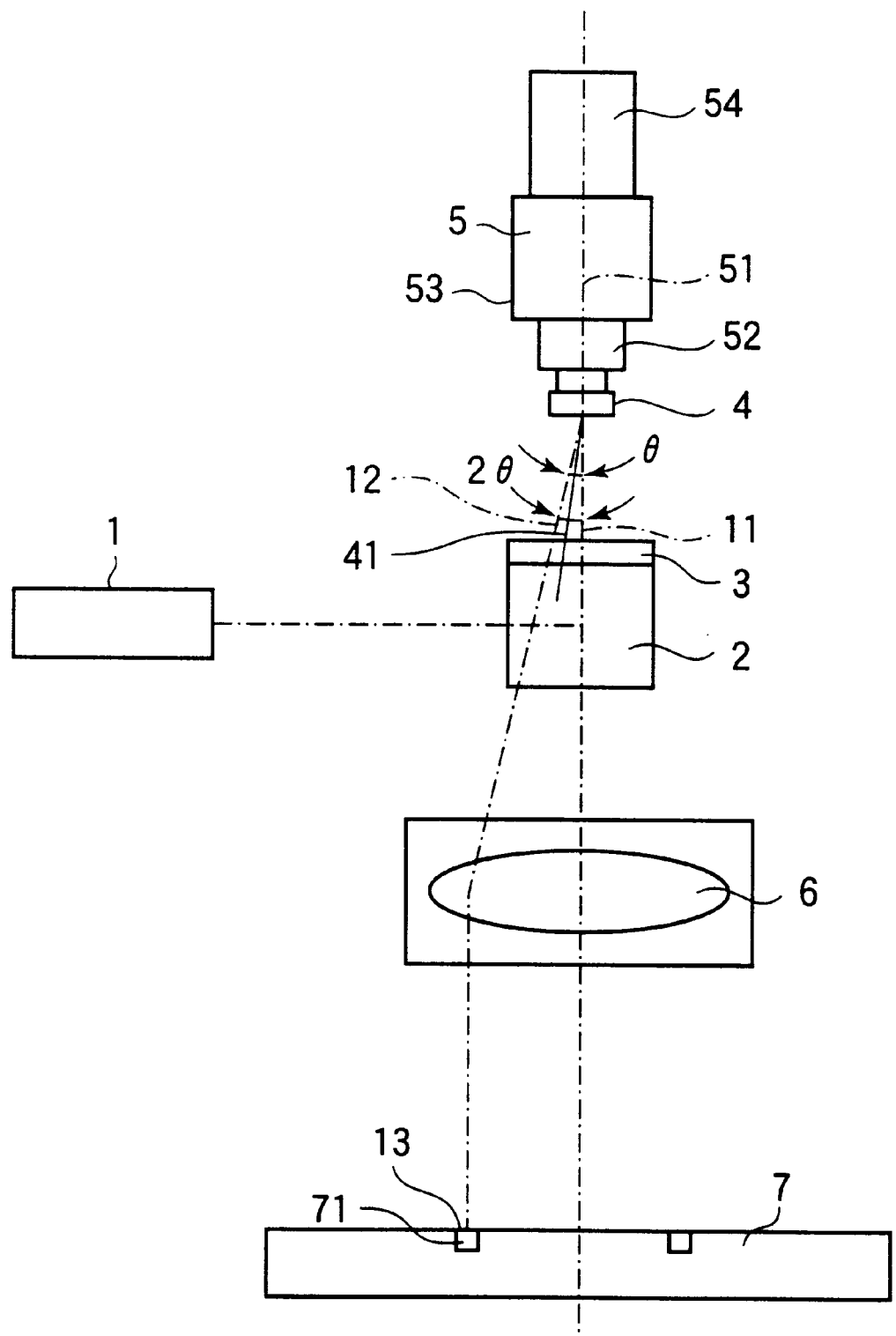
FIG. 6 is a side elevational view illustrating in detail the embodiment shown in FIG. 5.
Figure 7:
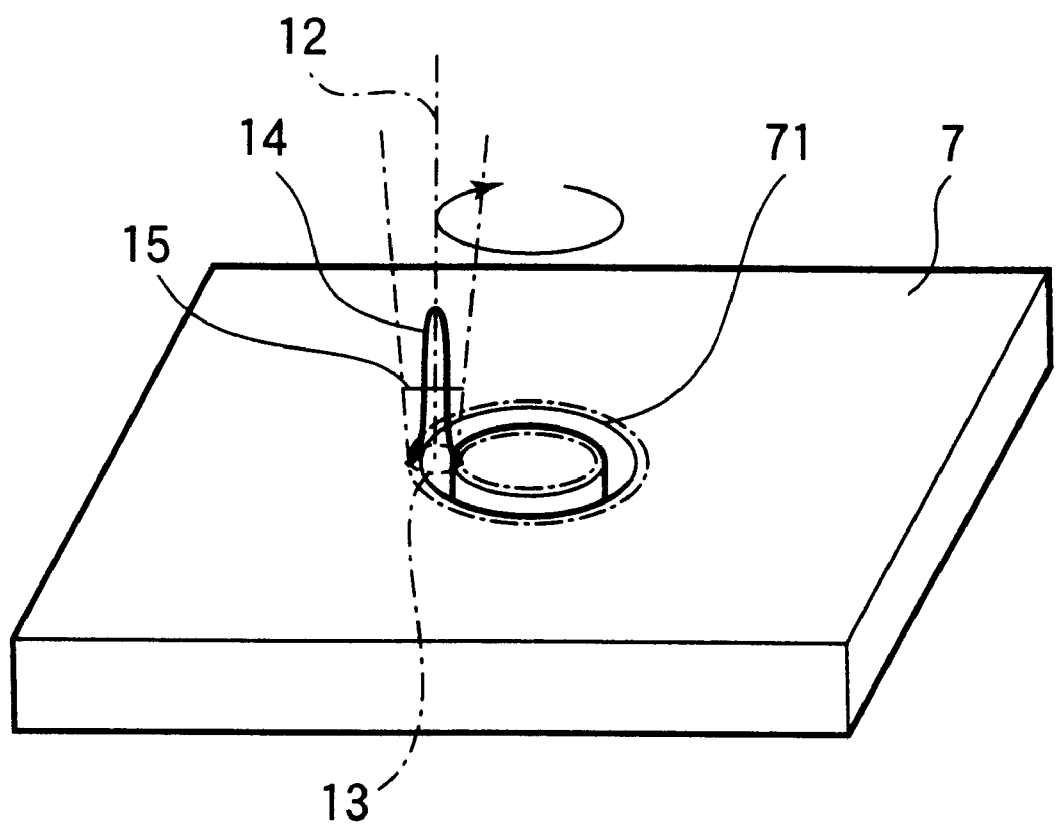
FIG. 7 is a partially enlarged perspective view illustrating in detail the embodiment shown in FIGS. 5 and 6.

FIG. 6 is a side elevational view from the side of FIG. 5. Also, FIG. 7 is an enlarged perspective of a primary part for illustrating the condition on the workpiece of FIGS. 5 and 6. As shown in FIG. 6, an incident light beam 11 reflected by the polarization beam splitter 2 and introduced into the reflector mirror 4 is adjusted and arranged so as to enter in parallel with a rotary axis 51 of the spindle motor 5.

Then, a normal line 41 of the reflector mirror 4 is fixed to a turn table 52 of the spindle motor 5 at a slant angle θ to the rotary axis 51 of the spindle motor 5.

For this reason, the incident light beam 11 introduced into the reflector mirror 4 is reflected at an angle of 2θ with respect to the rotary axis 51 of the spindle motor 5.

Then, a light beam 12 passes again through the ¼ wavelength plate 3, passes through the polarization beam splitter 2 under the condition that the polarization surface of the beam is rotated through 90 degrees to the incident light beam 11 and is converged to the position corresponding to the incident angle.

Note that, in this embodiment, the outgoing path and the incoming path of the light beam are separated by means of the polarization beam splitter 2. However, it is possible to use any other separating means such as a half-mirror or the like.

In this case, when the spindle motor 5 is rotated, the optical axis of the reflected light beam 12 takes a precession in synchronism with the spindle motor 5 while keeping a constant angle of 2θ to the rotary axis by taking a rotary axis 51 of the spindle motor 5 as its center.

Accordingly, a beam spot 13 on the workpiece 7 is also rotated. As shown in FIG. 7, in this case, when the output of the laser beam source 1 is increased, the energy concentrated on the position of the beam spot 13 of the workpiece 7 is increased, the portion exceeding a threshold value 15 of an energy distribution 14 is particularly heated and the material surface in the beam spot position is sublimated.

Then, when the rotation is repeated without any change to the high energy beam, the sublimation is accelerated little by little to the circular track depicted by the beam spot 13. Finally, the sublimation is accelerated up to the extent corresponding to the thickness of the plate to the circle. A circular contour is cut off so that the portion in the middle is separated to form the hole 71.

The laser beam 1 is selected based on the purpose such as a required precision, a desired hole diameter, a material of the workpiece 7 or the like. In the case where high machining energy as in the drilling work for the metal plate, a $CO_2$ laser is frequently used. An ultraviolet ray laser such as a YAG laser is suitable for forming a small hole having a diameter of 100 μm or less as in a resin plate or a thin copper plate.

In the embodiment, the rotation and drive of the spindle motor 5 is only effected in the movable portion so that the track of the beam spot 13 may be depicted in a circle with high reproducibility. Since the track precision of the beam spot 13 is affected only by the tilt amount of the rotary axis 51 of the spindle motor 5, the spindle motor that has the rotational precision as required is selected to thereby make it possible to secure the track precision as desired. There are various spindle motors in compliance with the required precision. There are spindle motors from one using a ball bearing that is less expensive for the bearing to one having a very high rotational precision using a fluid bearing or an air bearing. It is sufficient to select a suitable one according to the required precision of the hole to be formed. Since the drive device is only a mono-axial drive, the structure is simple and the control is also simple. Also, it is easy to attain the high speed drive of 10,000 rpm or more. Therefore, the reproducibility is also high.

Also, since the f-θ lens 6 is used as the convergent lens in this embodiment, it is possible to keep the position of the beam spot 13 unchanged even if the optical axis of the incident light beam 11 is not introduced into the center of the rotation of the reflector mirror 4. However, in the case where the optical axis of the incident light beam 11 is not located on the same axis as the rotary axis 51, the optical axis of the reflector light beam 12 is somewhat shifted in accordance with the vertical movement of the reflector surface of the reflector mirror 4 so that the energy distribution 14 of the beam spot 13 is shifted.

However, the adverse affect is limited to the phenomenon that the movement is substantially the same amount as the rate of the beam diameter converged to the original beam diameter in the converged condition. However, for example, in the case where the incident beam flux diameter of the laser beam of the Gaussian beam is 10 mm and the convergent beam diameter is 10 μm, even if the optical axis of the incident light flux is displaced by 1 mm away from the rotational axis, the displacement is 1 μm in terms of the displacement of the intensity center of the convergent beam.

As a matter of fact, it is sufficient to align the incident optical axis with the rotary center in the initial stage. Accordingly, there is no problem at all.

Since a non-contact type air bearing 53 is used in the spindle motor 5 in this embodiment, the tilt of the rotary axis is suppressed and the high speed rotation exceeding 20,000 rpm is possible. For this reason, since it is possible to perform the rotary deflection of the optical axis with high precision at a high speed, it is possible to perform the drilling process with high quality and with high productivity. Also, since the non-contact bearing is used, there is no wear and its service life is substantially eternal. It is also unnecessary to perform the maintenance.

Also, a brushless motor is used for a motor 54 so that there is no mechanical contact that causes the frictional wear as in the air bearing 53. It is therefore possible to stabilize the rotational drive with high precision and keep the drive substantially eternally. Accordingly, in view of not only the precision and the high speed property but also the reliability, the spindle motor 5 composed of the air bearing 53 and the brushless motor 54 is suitable for the laser machining apparatus as in this embodiment.

The laser machining apparatus according to this embodiment has the following effects.

The rotation of the laser beam spot 13 is performed only by means of the rotational drive of the spindle motor 5 whereby the drilling work may be performed with high precision and high reproducibility at a high speed. Also, it is possible to constitute the drive mechanism and the control system into a simple structure.

Also, the optical axis of the incident light beam 11 is introduced coaxially with and in parallel with the rotary axis 51 of the spindle motor 5 to cause the optical axis of the reflector light beam 12 to take a complete precession whereby in order to depict the complete true circle by the track of the convergent beam spot 13, it is possible to stabilize and perform the drilling work with high true circular degree.

Also, since the air bearing 53 is used as the spindle motor 5 for driving and rotating the reflector mirror 4, the rotational precision may be satisfactory while making it possible to perform the high speed rotation whereby it is possible to establish the high precision drilling work and the high productivity at the same time.

Furthermore, the brushless motor is used as the motor 54, there is no mechanical contact at all in addition to the use of the air bearing 53, it is possible to keep the machining precision substantially eternally while enjoying the maintenance-free advantage.

Note that, the present invention is not limited to the work for forming a circular hole but may be applied to a groove machining along a circle, a marking work or a photo formation machining.

What is claimed is:

1. A laser machining apparatus comprising:

a laser beam source;

a reflector mirror for reflecting a laser beam emitted from said laser beam source;

a rotating and driving motor for rotating and driving said reflector mirror; and a converging optical system for converging said laser beam reflected by said reflector mirror, wherein said reflector mirror is mounted so that a normal line of said reflector mirror is slanted to a rotary axis of said rotating and driving motor, and takes a precession about the axis of said rotating and driving motor.

2. A laser machining apparatus according to claim 1, wherein a laser spot converged by said converging optical system depicts a circular track on an object to be machined to continuously sublimate or chemically change the object to perform the machining.

3. A laser machining apparatus according to claim 1, wherein a beam splitter is disposed between said reflector mirror and said converging optical system.

4. A laser machining apparatus according to claim 1, wherein said rotating and driving motor is a spindle motor using an air bearing as a bearing for the rotary axis of said rotating and driving motor.

* * * * *